(12) United States Patent
Healy et al.

(10) Patent No.: US 7,236,120 B2
(45) Date of Patent: Jun. 26, 2007

(54) ULTRA-WIDEBAND DETECTOR SYSTEMS FOR DETECTING MOISTURE IN BUILDING WALLS

(75) Inventors: William Healy, Gaithersburg, MD (US); Eric Van Doorn, Frederick, MD (US)

(73) Assignee: United States of America as represented by the Secretary of Commerce, the National Institute of Standards and Technology, Washington, DC (US)

( * ) Notice: Subject to any disclaimer, the term of this patent is extended or adjusted under 35 U.S.C. 154(b) by 144 days.

(21) Appl. No.: 11/094,312

(22) Filed: Mar. 31, 2005

(65) Prior Publication Data

US 2005/0179578 A1 Aug. 18, 2005

(51) Int. Cl.
*G01S 13/89* (2006.01)
*G01V 3/12* (2006.01)

(52) U.S. Cl. .......................... 342/22; 342/21; 342/179; 342/180; 342/27; 342/132; 342/134; 342/137

(58) Field of Classification Search ................. 342/21, 342/22, 27, 85, 95, 115, 132, 134, 137
See application file for complete search history.

(56) References Cited

U.S. PATENT DOCUMENTS

| | | | | |
|---|---|---|---|---|
| 3,562,642 A | * | 2/1971 | Hochschild | 324/642 |
| 4,364,008 A | * | 12/1982 | Jacques | 324/636 |
| 4,675,595 A | * | 6/1987 | Hane | 324/640 |
| 5,384,543 A | * | 1/1995 | Bible et al. | 324/644 |
| 5,420,589 A | * | 5/1995 | Wells et al. | 342/22 |
| 5,883,591 A | * | 3/1999 | McEwan | 342/22 |
| 6,246,354 B1 | * | 6/2001 | Liedtke et al. | 342/22 |
| 6,534,985 B2 | * | 3/2003 | Holladay et al. | 324/334 |
| 6,535,141 B1 | * | 3/2003 | Doherty | 340/905 |
| 6,614,238 B1 | * | 9/2003 | Jean et al. | 324/639 |
| 2004/0153270 A1 | * | 8/2004 | Yamashita et al. | 702/81 |
| 2005/0179578 A1 | * | 8/2005 | Healy et al. | 342/22 |
| 2006/0061368 A1 | * | 3/2006 | Furse et al. | 324/519 |

OTHER PUBLICATIONS

"Wireless soil moisture sensor based on fringing capacitance", Wobschall, D.; Lakshmanan, D.Sensors, 2005 IEEE Oct. 30-Nov. 3, 2005 Ps: 1-4.*

(Continued)

*Primary Examiner*—John B. Sotomayor
(74) *Attorney, Agent, or Firm*—Stites & Harbison PLLC; Ross F. Hunt, Jr.

(57) ABSTRACT

A non-destructive detection method and system enables detecting a moisture patch located inside a building wall or the like. A transmitter generates a series of ultra-wideband pulses while an ultra-wideband antenna unit, preferably in the form of an antenna array including a plurality of switchable antenna pairs, directs the pulses toward the building structure so that the pulses are reflected therefrom, and receives the reflected pulses. A receiver processes the reflected pulses received by the antenna unit and produces a corresponding output. A controller controls the operation of the transmitter, receiver and antenna unit, and analyzes the output of the receiver for the presence of moisture inside of the building wall.

19 Claims, 1 Drawing Sheet

OTHER PUBLICATIONS

Derome et al; "Methods for the Assessment of Moisture Content of Envelope Assemblies"; Thermal Performance of the Exterior Envelopes of Buildings VII; Conference Proceedings; pp. 1-13; Dec. 2-7, 2001, ASHRAE.

Healy; "Moisture Sensor Technology-A Summary of Techniques for Measuring Moisture Levels in Building Envelopes"; Reprinted from ASHRAE Transactions; 2003; vol. 109, Pt. 1; Feb. 2003; pp. 232-242.

Lorenz et al; "Ultrasonic Imaging with Multi-SAFT: Nondestructive Characterization of Defects in Steel Components"; Nondestr. Test Eval; vol. 6; pp. 149-177; Mar. 1991.

Tenwolde et al; "Instrumentation for Measuring Moisture in Building Envelopes"; ASHRAE Trans. vol. 91; pp. 1101-1115; 1985.

\* cited by examiner

ULTRA-WIDEBAND DETECTOR SYSTEMS FOR DETECTING MOISTURE IN BUILDING WALLS

FIELD OF THE INVENTION

The invention relates to non-destructive detection methods and systems for detecting the presence of moisture inside of building walls.

BACKGROUND OF THE INVENTION

Moisture problems in buildings have received an increasing amount of interest as durability and mold issues have come to the attention of the public. Mold problems in buildings generally develop when certain conditions are present. These conditions comprise the presence of a food source, mold spores, water, and a temperature conducive to mold growth. Of these conditions, moisture is generally regarded as the one that is the most likely to be susceptible to control, in that most building materials provide a food source, mold is ubiquitous in the environment, and typical temperatures in buildings are conducive to growth of a wide range of molds. Other durability problems such as rotting of structural members of a building can also be caused by excess moisture in building components. Moisture-related issues have escalated to the point where significant litigation is occurring, and homeowners, builders, and insurance companies are all being adversely affected.

As moisture issues in buildings continue to draw significant attention, tools for diagnosing excess moisture within the building envelope are needed by practitioners and researchers. Ideally, such a tool would be non-destructive, and in this regard, the anecdotal evidence seems to indicate that one of the most common methods used to locate moisture problems involves simply tearing walls apart. However, better alternatives are available and should obviously be used in place of these more primitive techniques.

Considering some of these alternatives, instruments such as electrical resistance pin probes, capacitance meters, and relative humidity sensors are frequently used to estimate the moisture content of building materials. Each of these instruments has positive and negative features as described by several authors. (See, e.g., TenWolde. A, and G. E. Courville, 1985, "Instrumentation for Measuring Moisture in Building Envelopes," ASHRAE Trans. Vol. 91, pp. 1101–1115; Healy, W. M., 2003, Moisture Sensor Technology—a summary of techniques for measuring moisture levels in building envelopes. (to appear in ASHRAE Trans.); Derome, D., A. Teasdale-St-Hilaire, and P. Fazio., 2001. Methods for Assessment of Moisture Content of Envelope Assemblies. Thermal Performance of the Exterior Envelopes of Buildings VII. Conference Proceedings, Clearwater Beach, Fla. Dec. 2–7, 2001, ASHRAE. ) The use of pin probes is a popular technique for detecting moisture in buildings is by using pin probes. Two pins are inserted into the building material, and the electrical resistance between the probes is measured. However, this technique is destructive, and gaining access to layers within the wall can be difficult. Another drawback of probes such as a pin probe is the fact that contact is needed with the moist specimen in order to diagnose excess moisture. Tools that do not require contact to locate moisture problems in walls would be preferable in finding problems in a non-destructive manner. Furthermore, techniques that can scan larger areas of the building envelope would enable isolating areas of excessive moisture in a manner that is substantially more efficient than the more laborious approaches of the prior art that involve examining individual areas with localized meters and sensors.

One prior art technique, the capacitance meter, involves pressing pads against a wall and measuring the capacitance of the wall. However, this technique is not able to pinpoint the location of water within the wall. More specifically, while a capacitance meter might indicate the presence of water in a wall, such a meter cannot provide very precise spatial resolution with respect to the location of the water.

SUMMARY OF THE INVENTION

In accordance with the invention, there is provided an ultra-wideband moisture detection system that enables non-destructive detection of moisture in a building structure such as a building wall. In addition to the advantage of providing non-destructive detection, another advantage of the invention as compared to prior art, is the ability thereof to generate real-time images of the moisture state of the building structure using an antenna array and a controller.

According to one aspect of the invention, these is provided a non-destructive detection system for detecting moisture inside of a building structure, the system comprising a transmitter for generating a series of ultra-wideband pulses;

an ultra-wideband antenna unit for directing the pulses toward the building structure so that the pulses are reflected therefrom, and for receiving the reflected pulses;

a receiver for processing the reflected pulses received by said antenna unit and for producing a corresponding output; and a controller for controlling said transmitter, said receiver and said antenna unit and for analyzing said output of said receiver for the presence of moisture inside of the building structure.

Preferably, the ultra-wideband antenna unit is capable of receiving reflected pulses from different antenna locations relative to the building structure, and, in one embodiment, the antenna unit is mounted on a robot arm to effect this.

In a preferred, highly important embodiment, the ultra-wideband antenna unit comprises a fixed ultra-wideband antenna array comprising a plurality of antennas individually switchable between operation as a transmitting antenna and operation as a receiving antenna so as to enable creation of a plurality of different antenna locations relative to the building structure.

Preferably, the system further comprises electronic switching means for controlling switching of the plurality of antennas. Advantageously, the switching means is integrated with the antenna array.

In one important embodiment thereof, the controller generates a synthetic aperture image based on the output of the receiver for the plurality of antenna locations.

Preferably, the controller controls the transmitter, the receiver and the switching of the antenna array so as to produce a plurality of different antenna scans involving a plurality of different transmitting and receiving antenna pairs, averages the output of the receiver over time for each scan, lines up all of the plurality of scans in time, and further processes the plurality of scans after the scans have been lined up.

More generally, in another preferred embodiment, the antenna unit provides a plurality of different antenna locations, and the controller generates a synthetic aperture image based on the output of the receiver for said plurality of antenna positions.

In an important implementation, the controller generates a three-dimensional representation of moisture within the structure. Preferably, in this implementation, the structure comprises a building wall, and the controller generates a three-dimensional representation of the moisture state of the wall. In a specific advantageous embodiment, the transmitter generates said pulses at a rate of on the order of 10 million pulses per second and return pulses are averaged to eliminate the effect of random noise.

According to a further aspect of the invention, there is provided a method for a non-destructive detection of moisture inside of a building structure, the method comprising:

generating a series of ultra-wideband pulses;

using an ultra-wideband antenna unit to direct the pulses toward the building structure so that the pulses are reflected therefrom, and to receive the reflected pulses, the ultra-wideband antenna unit receiving reflected pulses from different antenna locations relative to the building structure;

processing the reflected pulses received by the antenna unit and producing a corresponding output; and analyzing said output for the presence of at least on feature inside of the building structure and not visible from outside of the structure.

In a highly important implementation, the ultra-wideband antenna unit comprises an ultra-wideband antenna array positioned at a fixed location on one side of the building structure and comprising a plurality of antennas individually switchable between operation as a transmitting antenna and operation as a receiving antenna, at least some of the antennas of the array being switched so as to create a plurality of different antenna locations relative to the building structure. Preferably, an electronic switching means is used for controlling switching of the plurality of antennas.

Preferably, a synthetic aperture image is generated based on said output for the plurality of antenna locations.

As above, the transmitter, the receiver and the switching of the antenna array are all controlled by a controller so as to produce a plurality of different antenna scans involving a plurality of different transmitting and receiving antenna pairs, the output of a receiver is averaged over time for each scan, further processed all of the plurality of scans are lined up in time, and the plurality of scans are after the scans have been lined up.

More generally, the antenna unit provides a plurality of different antenna locations and the controller is used to generate a synthetic aperture image based on the output of the receiver for the plurality of antenna positions.

In one preferred implementation, a three-dimensional representation of the moisture within the structure is generated. In a preferred embodiment of this implementation, the structure comprises as building wall, and a three-dimensional representation of the moisture state of the wall is generated.

As above, in specific advantageous embodiment, the pulses are generated at a rate of on the order of 10 million pulses per second, and return pulses are averaged to eliminate the effect of random noise.

Further features and advantages of the present invention will be set forth in, or apparent from, the detailed description of preferred embodiments thereof which follows.

DESCRIPTION OF THE PREFERRED EMBODIMENTS

Figure 1:
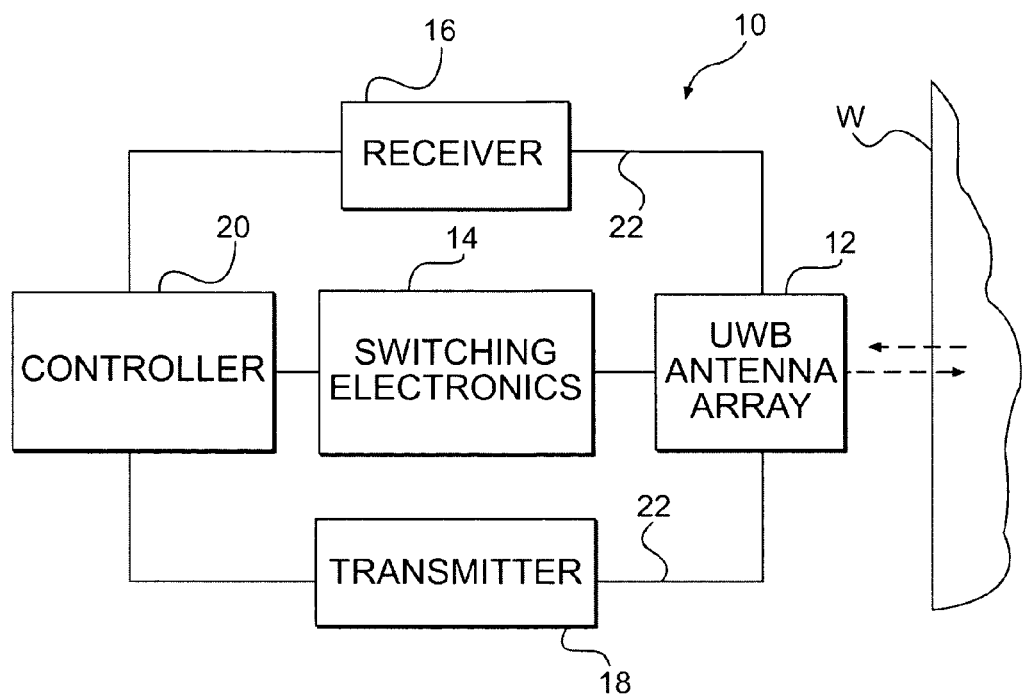
FIG. 1 is schematic block diagram of a non-destructive moisture detection system according to a preferred embodiment of the invention.

One underlying physical principle of the invention is that the reflection of radio frequency waves, i.e., radio waves, from a building material increases with the moisture content of that material. The sensitivity of radio waves to moisture is a result of the large difference between the dielectric constant of water (which has a dielectric constant, $\in_r$, equal to 81) and that of porous building materials such as wood (which have an $\in_r$ of about 5). The dielectric constant affects the propagation of radio waves in several ways. First, the speed of propagation of electromagnetic waves, c, through a solid is dependent upon the dielectric constant as described by the equation below:

$$c = \sqrt{\mu_0 \mu_r / (\in_0 \in_r)}$$

where $\mu_0$ = the magnetic permeability of free space $\mu_r$ = the relative magnetic permeability of the medium to that of free space $\in_0$ = the permittivity of free space $\in_r$ = the dielectric constant of the medium.

The second way in which moisture affects the propagation of radio waves through a solid is through reflection at the interface between the surface of the solid and the adjacent material. The reflection at the interface between a first material (material 1) and a second material (material 2) is governed by the reflection coefficient, $\Gamma_{12}$:

$$\Gamma_{12} = \frac{c_1 - c_2}{c_1 + c_2}$$

where $c_1$ and $c_2$ are the speed of light in materials 1 and 2, respectively.

The result of this computation is the ratio of the amplitude of the reflected waves to that of the incoming waves. Since $c_1$, and $c_2$ depend upon the dielectric coefficient, the reflection coefficient also depends upon the dielectric coefficient. The dielectric coefficient affects attenuation of the electromagnetic waves as well, though this characteristic is not used in the sensing method and system described here.

It should also be noted that the dielectric constant is a function of frequency and temperature. Accordingly, adjustments may be needed to any measurements made at temperatures differing greatly from that at which a material is calibrated. The fact that the dielectric constant varies with frequency may actually be an advantage with respect to the use of ultra-wideband signals, considering the large frequency spectrum contained in the pulses.

Another important feature of the sensing method according to this aspect of the invention is the use of Ultra-Wideband (UWB) radio signals. Ultra-wideband radio signals are electromagnetic transmissions comprised of a broad range of frequencies. By definition, a signal is considered to be ultra-wideband if the relative bandwidth thereof, η, is greater than 0.25. The relative bandwidth η is defined as:

$$\eta = \frac{f_h - f_l}{f_h + f_l}$$

where:
$f_h$=highest frequency contained in signal
$f_l$=lowest frequency contained in signal.

There are a number of ways to generate such UWB signals. In one important embodiment, commercially available radio levels are used that broadcast signals at a center frequency of 4.7 GHz and with a bandwidth of 3.2 GHz. These radio levels are discussed in further detail hereinbelow.

A conventional radio is a narrowband device, i.e., the radio uses a single frequency in the radio spectrum. However, in principle, the use of multiple frequencies yields more information about moisture content or level, than a single frequency because the dielectric constant of moisture is a function of frequency. More information can, therefore, be obtained by emitting a broadband signal towards a surface and detecting the reflection of various frequencies.

An additional benefit of using UWB signals is that some frequencies can penetrate a particular layer, while other frequencies may reflect from that layer. Further, frequencies that penetrate the first layer may reflect from subsequent layers, thereby providing information on materials within a wall that are hidden from view. This characteristic of UWB signals allows information to be obtained regarding the moisture level of different layers within a building assembly using single measurements from one side of a wall.

Referring to FIG. 1, a preferred embodiment of the moisture detector system of the invention is shown. This detector system, which is generally denoted 10, is intended to be used on one side of a wall W. An antenna array 12 is directed or aimed at the wall W at relatively close proximity. Array 12 both emits ultra-wideband pulses and receives the pulses reflected from the wall W. The individual antennas of array 12 from which pulses are emitted or received can be changed by an electronic switching circuit 14 which is connected to, or forms part of, the array 12.

The electromagnetic pulses that are picked up by an antenna or antennas of the antenna array 12 are sent to an ultra-wideband radio receiver 16 which averages the received pulses at each antenna. A radio transmitter 18 is also connected to antenna array 12.

The detector system 10 is driven by a controller 20 that controls the antenna switching circuit 14 and receives the digital signal from the radio receiver 16.

The controller 20 includes software providing data analysis. A number of different data analysis techniques can be used. For example, in a simple embodiment, the reflected signals from a single antenna of array 12 can be analyzed to determine the moisture content of individual moisture layers.

A second type of analysis used in accordance with a further preferred embodiment of the invention involves the creation of images depicting the moisture level within the wall. The basic technique is known and is termed Synthetic Aperture Imaging (SAI). In one embodiment, an antenna is attached to a robotic arm (not shown) and the antenna is moved in front of the wall. The use of antenna array 12 enables creation of this image automatically. With this technique, a system user is provided an image of the reflections as a function of the three dimensions x, y, and z. The user can then manipulate these images to examine particular layers within the wall to determine their moisture level. Images of regions of high planes and three-dimensional representations of the wall can be obtained.

It will be appreciated from the foregoing that the system may be thought of as including the following basic components: (1) the Ultra-Wideband (UWB) radio transmitter 18 and receiver 16 for emitting and processing radio signals, (2) the antenna array 12 which, in a preferred embodiment comprises of sixteen UWB antennas and incorporates switching circuit 14 and (3) the controller 20 including software to process the reflected radio signals. The resulting system 10 analyzes the reflected signals in such a way that moisture levels are detected. Each of these components will be considered in more detail below.

One requirement of this embodiment is that the system of the invention employ a radio transmitter-receiver that both can broadcast UWB signals and receive those signals. The radios used in one exemplary embodiment of the invention are commercially available radio transmitter-receivers from Time Domain Inc. (PulsOn 200 Evaluation Kit). It will of course, be appreciated that the invention is not limited to the use of such radios and the system 10 of the invention can use any similar type of hardware. The transmitter 18 for these pulses is set at a power level below the ambient noise floor. In an exemplary implementation, the pulses are transmitted at a rate of approximately ten million pulses per second.

By averaging the reflections from many pulses received by receiver 16 the system 10 is able to determine the reflected signal energy, because the random noise is averaged to zero. An important feature of any UWB transmitter (corresponding to transmitter 18) is the ability to time the emission of the signal and to temporally resolve the signal to a very fine level. As stated previously, the hardware that is used in a preferred embodiment can generate pulses at a rate of approximately ten million pulses per second, yielding an average spacing between pulses of 100 ns.

The receiver equipment 16 is also capable of resolving the received signals down to a level of 3.12 ps. This ability to resolve the time when a signal is received is critical in providing the necessary spatial resolution for locating moisture within walls. The exemplary transmitter-receiver equipment is FCC compliant, meaning that the use thereof within a building should pose no problems for other electronic devices or for people in the building.

As indicated above, one aspect of the invention involves generating Synthetic Aperture Images, e.g., of the wall W, so as to locate a moist patch. These images provide three-dimensional representation of the moisture state of the wall by analyzing and combining reflections obtained at different locations in front of the wall W. Multiple scanning locations are required to pinpoint an area of high reflection since the RF pulses obtained at any single location can be made up of reflections from any number of surfaces. This aspect of the invention is discussed further below. The hardware requirements for this type of analysis include the need for a accurately positioned antenna so as to provide the multiple scans of the reflected energy that are combined to create the Synthetic Aperture Images.

As was also indicated above, in one embodiment, antennas can be connected to a robotic arm (not shown) that automatically positions the antennas in the desired position to receive reflected energy from different sections of the wall. However, in a preferred embodiment of the invention, the robotic arm is replaced with the fixed antenna array 12.

As set forth above, in an preferred exemplary implementation, array 12 includes sixteen antennas. In a specific implementation, the antennas are arranged on a flat plate (not shown) in a four by four grid, with each of the rows and columns being equally spaced. The faces of the antennas of array 12 are set to be parallel to the wall surface. The antennas of array 12 are identical, so that any of the antennas can serve as either a UWB transmitter or a UWB receiver.

Electronic switches 14 are preferably integrated with the array 12 and select which antenna (or antennas) serves as a transmitter and which serves as a receiver.

The array 12 is connected to the radio receiver 16 and transmitter 14 through a cable 22 and, as indicated previously, controller 20 controls the electronic switches 14 and the radio transmitter 18 that generates the outgoing signal that is transmitted by one or more of the antennas of array 12 and processes the signal that is received at any of the antennas by receiver 16.

Preferably, array 12 is placed in a stationary position in front of the building portion or assembly of interest. The switches 14 automatically create the different antenna locations that are needed to generate the Synthetic Aperture Image. With the spacing between antennas being fixed and the distance to the wall also being fixed, the controller 20 can automatically create an image which shows regions of high reflection in the wall and which thus may indicate the presence of moisture.

Turning now to a further consideration of controller 20, controller 20 incorporates software that controls the radio transmitter 18, receiver 16 and antenna array 12 so as to acquire scans of the reflected energy from the building part or assembly of interest (e.g., wall W). Controller 20 uses principal component analysis to determine the reflected signals of individual layers (e.g., within the wall W) and creates instantaneous Synthetic Aperture Images that show the various levels of reflection (e.g., within the wall W). As a first step, the software of controller 20 automatically selects the transmitting and receiving antennas of array 12. Pulses are transmitted by the transmitting antenna or antennas of array 12 and the signal at the receiving antenna or antennas of array 12, as processed by radio receiver 16 is acquired and averaged by this software. The software then lines up all of the scans in time, a task that is needed to process the signals. In the exemplary embodiment under construction, the task is repeated for sixty-four different antenna transmitter/receiver pairs of the sixteen antennas of array 12 in matter of seconds.

As set forth hereinabove, one aspect of the invention concerns providing SAR Images. By way of background, in a stationary system in which one antenna transmits a signal and a second antenna receives the reflections of that signal from various objects, the typical output scan shows the voltage received at the receiving antenna as a function of time. Reflections come from many different surfaces, so reflected signals will return to the receiving antenna over a large time frame. To create an image from these multiple scans a prior art technique (see, e.g., Lorenz, M., L. F. van derWal, A. J. Berkhout., 1991, Nondestructive Characterization of Defects in Steel Components, *Nondestr. Test Eval.*, Vol. 6, pp. 149) is implemented. In this regard, by noting that the waves travel at the speed of light, the path length of the reflected wave can be determined, and an educated guess can be made regarding the surface from which it has been reflected.

Figure 2:
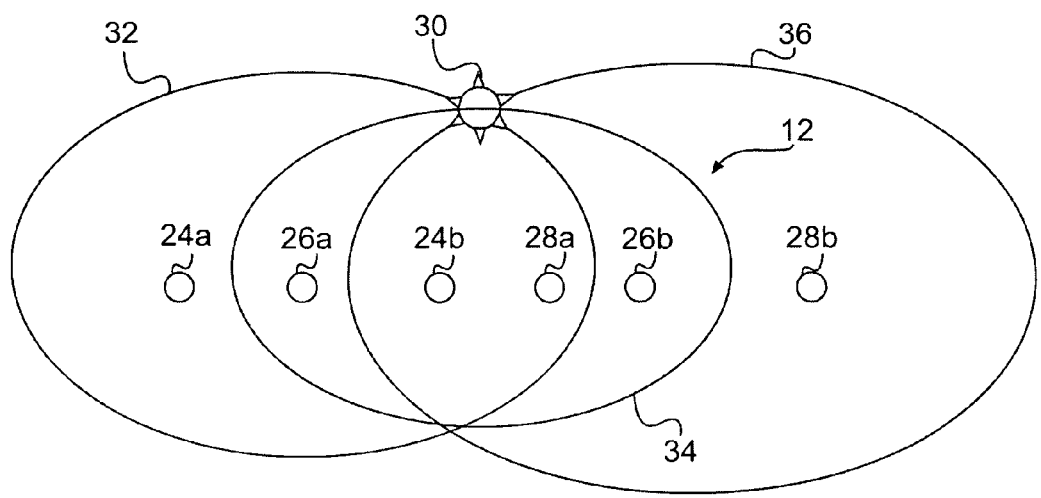
FIG. 2 is a schematic diagram of a number of antenna pairs of the antenna array of the system of FIG. 1, used in explanation of the operation of one embodiment of the system.

Referring to FIG. 2, a portion of antenna array 12 is shown which includes three antenna pairs, viz., 24*a*, 24*b* and 26*a*, 26*b* and 28*a*, 28*b*. A reflector is indicated at 30 (corresponding, e.g., to a moisture spot) and three hyperbolic times of flight are indicated at 32, 34 and 36. With knowledge of only the time between the transmission of a signal from one antenna and the reception thereof at second antenna, one can only pinpoint the location of the reflector 30 on a hyperbolic shape. However, by including different antenna positions, triangulation can be used to pinpoint the location of reflection 30. In other words, for a given time of flight, the exact point of reflector is not known exactly, but it is known that the reflection will have occurred on a hyperboloid as shown in FIG. 2 (i.e., all points on the surface have the same combined distance to the two foci of the shape defined by the antennas of the antenna pair). This estimate assumes that all responses received at the receiving antenna are from single reflections and that the speed of light changes little in the different materials through which the radio waves pass. A longer time of flight corresponds to a larger hyperbola, so information is gained about the surroundings at each set of antenna positions.

There is still uncertainty, however, as to where a particular amplitude in the signal obtained at the receiver 16 originates. To resolve this uncertainty, triangulation is used between multiple antenna positions to identify the source of the reflection source. While a number of radio frequency techniques have been used to locate moisture, the time resolution provided by the UWB hardware and the ability of the UWB waves to penetrate various forms of construction make a UWB system an attractive choice for carrying out such analyses.

To create an image of a building wall or like structure, e.g., wall W, scans are taken at different locations in front of the wall W, and the wall W is then divided or discretized into an array of pixels. For each scan, the amplitude of the received signal is examined as a function of the time after the initial transmission of the signal. At each time of flight, the amplitude of the signal is added to all pixels in the discretized wall section that lie on the hyperboloid corresponding to the time of flight. Next, the antenna locations are changed by the electronic switches 14 in the array 12, and the process is then repeated. Pixels that represent an actual location of moisture within the wall will continue to be identified by all scans and will therefore receive a higher amplitude tally as more scans are added to the map.

In actual testing, images have been generated using this imaging technique on a wall with a simulated wet patch. The images clearly show the wet patch and enable the relative size thereof to be determined. In this regard, these images were generated with the antenna on the robotic arm discussed above, instead of with the antenna array 12, but it is expected that the result would be the same with array 12.

In this testing, the test wall section was comprised of 7.6 cm (3 in) of R-19 fiberglass insulation sandwiched between a 1.27 cm (0.5 in) sheet of gypsum board and a 1.27 cm (0.5 in) layer of oriented strand board. The insulation had kraft paper that faced the gypsum board. Panels of these materials measuring 0.61 m (2 ft) wide by 0.91 m (3 ft) tall were placed within a frame constructed of two by fours of sugar pine. The rig was constructed so that panels of varying moisture content could be interchanged to obtain a wide range of moisture conditions. To simulate water intrusion, a wet cloth wrapped in plastic was temporarily attached to different places of the wall. The dry cloth and plastic bags were also tested to ensure that they had no independent effect on the reflected radio signals.

The software used by controller 20 generates images that can be adjusted to show the particular wall layer of interest.

Using this software, a snapshot of the wall is taken with the UWB hardware, and the user can scan around the image to find areas of potential moisture or other features that are characterized by larger reflections. Other features that reflect the signal include pipes, nails, studs, and wires and the detection system 10 can also be used to determine the location of these features within a wall.

As indicated above, the major application envisioned for the system of the invention is the location of potential moist spots within building walls. As discussed previously, current techniques for locating moisture involve crude instruments that cannot specify the location of moist spots or do so in a destructive manner. The system of the invention can be used to scan a wall to examine potential anomalies at a spot on the wall. Once such anomalies are detected, more detailed inspection of that spot can be carried out to determine the problem.

Although the invention has been described above in relation to preferred embodiments thereof, it will be understood by those skilled in the art that variations and modifications can be effected in these preferred embodiments without departing from the scope and spirit of the invention.

What is claimed is:

1. A non-destructive detection system for detecting moisture inside of a building structure which is not visible from outside of the structure, said system comprising:
    a transmitter for generating a series of ultra-wideband pulses;
    an ultra-wideband antenna unit for directing the pulses toward the building structure so that the pulses are reflected therefrom, and for receiving the reflected pulses;
    a receiver for processing the reflected pulses received by said antenna unit and for producing a corresponding output; and
    a controller for controlling said transmitter, said receiver and said antenna unit and for analyzing said output of said receiver for the presence of moisture inside of the building structure,
    said ultra-wideband antenna unit comprising means for providing a plurality of different antenna locations relative to the building structure and means for receiving reflected pulses from the different antenna locations relative to the building structure.

2. A system as claimed in claim 1 wherein said ultra-wideband antenna unit comprises a fixed ultra-wideband antenna array comprising a plurality of antennas individually switchable between operation as a transmitting antenna and operation as a receiving antenna so as to enable creation of said plurality of different antenna locations relative to the building structure.

3. A system as claimed in claim 2 further comprising electronic switching means for controlling switching of said plurality of antennas.

4. A system as claimed in claim 3 wherein said switching means comprises a switching unit integrated with the antenna array.

5. A system as claimed in claim 2 wherein said controller generates a synthetic aperture image based on the output of said receiver for said plurality of antenna locations.

6. A system as claimed in claim 2 wherein the controller controls the transmitter, the receiver and the switching of the antenna array so as to produce a plurality of different antenna scans involving a plurality of different transmitting and receiving antenna pairs, averages the output of the receiver over time for each scan, lines up all of the plurality of scans in time, and further processes the plurality of scans after the scans have been lined up.

7. A system as claimed in claim 1 wherein the controller generates a three-dimensional representation of moisture within said structure.

8. A system as claimed in 7 wherein the structure comprises a building wall, and said controller generates a three-dimensional representation of the moisture state of the wall.

9. A system as claimed in claim 1 wherein said transmitter generates said pulses at a rate of on the order of 10 million pulses per second and said controller averages return pulses to eliminate the effect of random noise.

10. A method for non-destructive detection of moisture inside of a building structure, said method comprising:
    generating a series of ultra-wideband pulses;
    using an ultra-wideband antenna unit to direct the pulses toward the building structure so that the pulses are reflected therefrom, and to receive the reflected pulses, said ultra-wideband antenna unit receiving reflected pulses from different antenna locations relative to the building structure;
    processing the reflected pulses received by the antenna unit and producing a corresponding output; and
    analyzing said output of said receiver for the presence of moisture inside of the building structure, the ultra-wideband antenna unit comprising an ultra-wideband antenna array positioned at a fixed location on one side of the building structure and comprising a plurality of antennas individually switchable between operation as a transmitting antenna and operation as a receiving antenna, and at least some of said antennas of the antenna array being switched to create of a plurality of different antenna locations relative to the building structure.

11. A method as claimed in claim 10 wherein a electronic switching means is used to control switching of the plurality of antennas.

12. A method as claimed in claim 10 further comprising generating a synthetic aperture image based on said output for the plurality of antenna locations.

13. A method as claimed in claim 10 wherein the transmitter, the receiver and the switching of the antenna array are controlled so as to produce a plurality of different antenna scans involving a plurality of different transmitting and receiving antenna pairs, said output is averaged over time for each scan, all of the plurality of scans are lined up in time, and the plurality of scans are further processed after the scans have been lined up.

14. A method as claimed in claim 10 wherein said plurality of antennas provide a plurality of different antenna locations, and a synthetic aperture image is generated based on said output for said plurality of antenna positions.

15. A method as claimed in claim 10 wherein a three-dimensional representation of a feature of interest within said structure is generated.

16. A method as claimed in claim 15 wherein the structure comprises a building wall, and a three-dimensional representation of the moisture state of the wall is generated.

17. A method as claimed in claim 10 wherein said transmitter generates said pulses at a rate of on the order of 10 million pulses per second and wherein return pulses are averaged to eliminate the effect of random noise.

18. A non-destructive detection system for detecting moisture inside of a building structure which is not visible from outside of the structure, said system comprising:

a transmitter for generating a series of ultra-wideband pulses;

an ultra-wideband antenna unit for directing the pulses toward the building structure so that the pulses are reflected therefrom, and for receiving the reflected pulses;

a receiver for processing the reflected pulses received by said antenna unit and for producing a corresponding output; and a controller for controlling said transmitter, said receiver and said antenna unit and for analyzing said output of said receiver for the presence of moisture inside of the building structure, said ultra-wideband antenna unit comprises a fixed ultra-wideband antenna array comprising a plurality of antennas individually switchable between operation as a transmitting antenna and operation as a receiving antenna so as to enable creation of said plurality of different antenna locations relative to the building structure.

19. A non-destructive detection system for detecting moisture inside of a building structure which is not visible from outside of the structure, said system comprising:

a transmitter for generating a series of ultra-wideband pulses;

an ultra-wideband antenna unit for directing the pulses toward the building structure so that the pulses are reflected therefrom, and for receiving the reflected pulses;

a receiver for processing the reflected pulses received by said antenna unit and for producing a corresponding output; and a controller for controlling said transmitter, said receiver and said antenna unit and for analyzing said output of said receiver for the presence of moisture inside of the building structure, said antenna unit including a plurality of antennas positioned at a plurality of different antenna locations and said controller generating a synthetic aperture image based on the output of said receiver for said plurality of antenna locations.

* * * * *